United States Patent Office 3,334,115
Patented Aug. 1, 1967

3,334,115
BASICALLY SUBSTITUTED UREAS AND SALTS THEREOF
Herbert Arnold and Rolf Rebling, Bielefeld, and Jürgen Potel and Wolfgang Ebeling, Brackwede, Germany, assignors to Asta-Werke AG, Chemische Fabrik, Brackwede, Germany, a corporation of Germany
No Drawing. Filed Jan. 26, 1965, Ser. No. 429,206
Claims priority, application Germany, Jan. 30, 1964, A 45,119
10 Claims. (Cl. 260—309.7)

The present invention is related to new compounds having fungistatic and fungicidal properties.

It is an object of the present invention to provide new compounds having improved therapeutical properties. Further objects of the present invention and advantages thereof will become apparent as the description proceeds.

The compounds according to the present invention represent basically substituted cyclic ureas (imidazolidones) of the Formula I

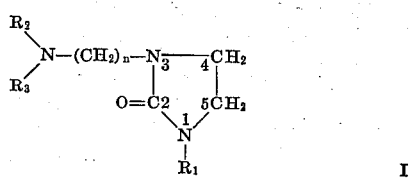

wherein $R_1$ is a member selected from the group consisting of the saturated and unsaturated aliphatic hydrocarbon groups having 12 to 18 carbon atoms and $n$ is a numeral selected from the group consisting of 2 and 3 and $R_2$ and $R_3$ represent members selected from the group consisting of the lower alkyl groups and, together with the nitrogen atom to which they are attached, the piperidino, morpholino and pyrrolidino groups, and salts thereof with non-toxic acids.

Preferably, $R_2$ and $R_3$ in Formula I are ethyl groups.

The hydrochloride is the preferred salt. However, any pharmaceutically acceptable non-toxic acid may be used for salt formation such as, for instance, gluconic acid, lactic acid, succinic acid, tartaric acid, citric acid and embonic acid.

The new basically substituted cyclic ureas of Formula I may be produced in a manner known per se by subjecting a cyclic urea of the Formula II

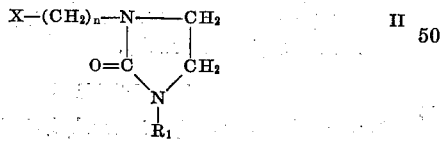

wherein X is a halogen atom, preferably a chlorine atom, and $R_1$ and $n$ have the same meaning as in the Formula I, to reaction with a secondary amino compound of Formula III

wherein $R_2$ and $R_3$ have the same meaning as in Formula I, in the presence of an acid binding agent at an elevated temperature and, if desired, converting the thus obtained basically substituted cyclic ureas in a salt of a non-toxic acid by reaction therewith.

In the process according to the present invention organic bases such as for instance tertiary amines, such as triethylamine or pyridine, or the secondary amine of Formula III itself or inorganic bases such as alkali metal carbonates or bicarbonates, such as sodium or potassium carbonate or bicarbonate, may be used as acid binding agents. Preferably, the secondary amine compound of Formula III is used in excess.

Preferably, the process according to the invention is carried out in the presence of an inert organic solvent such as dioxane or benzene. The reaction is carried out at the boiling point of the applied solvent or in an autoclave at about 120° C. However, the reaction may also be carried out without a solvent.

The cyclic ureas of Formula II which are used in the process according to the present invention as starting materials may be obtained according to the process which is described in copending patent application Ser. No. 388,983 filed on Aug. 5, 1964, and entitled, "Process for the Production of Imidazolidones." According thereto, the compounds of Formula II may be produced by subjecting oxazolidones to reaction with isocyanates according to the following equation:

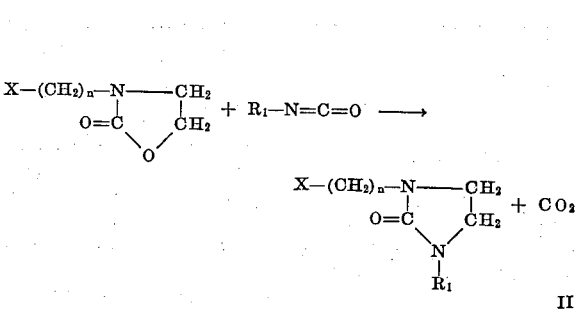

The basically substituted cyclic ureas of Formula I according to the present invention exert a strong in vivo and in vitro growth inhibiting effectiveness to certain fungi such as those of the trichophyton group and to *Candida albicans* as shown in the following table. Furthermore, they not only inhibit the growth of the fungi but also kill vegetative formations and spores.

Table: Effectiveness of compound of the formula

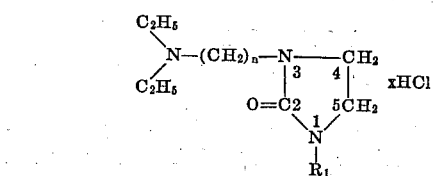

| $R_1$ | n | Complete growth inhibition in the tube dilution test (μg./ml.) | |
|---|---|---|---|
| | | Trichophyton mentagrophytes | Candida albicans |
| n-$C_4H_9$— | 2 | >50 | >50 |
| n-$C_{12}H_{25}$— | 3 | 8 | 32 |
| n-$C_{14}H_{29}$— | 2 | 2.1 | 8.4 |
| n-$C_{16}H_{33}$— | 2 | 2.3 | 9 |
| $CH_3$—$(CH_2)_7$—$CH$=$CH$—$(CH_2)_8$— | 2 | 2.5 | >50 |
| n-$C_{18}$—$H_{37}$— | 2 | 18.8 | >50 |

The present invention is further illustrated by the following examples without however limiting the same thereto.

Illustrative example for the production of the starting materials:

*1 - n - tetradecyl - 3 - (β - chloroethyl) - imidazolidone-(2)*.—0.9 mols (215.5 g.) of n-tetradecyl isocyanate and 0.9 mols (134.6 g.) of N-β-chloroethyl-oxazolidone-(2) are heated together with 0.2 mols (8.5 g.) of lithium chloride at 160–180° C. After 8 hours the formation of carbon dioxide is terminated. The cooled reaction mixture is dissolved in 500 ml. of methylene chloride, the resulting solution is washed several times with water and dried over anhydrous sodium sulphate. After the solvent as been distilled off, the residue is recrystallized from 400 ml. of petroleum ether. Thus, 1-n-tetradecyl-3-(β-chloroethyl)-imidazolidone-(2) having a melting point at 34–37° C. is obtained in a yield of 222 g. (71.5% of the theoretical).

The other chloroalkyl imidazolidones used for the production of the compounds according to the present invention have been obtained in an analogous manner.

EXAMPLE 1

*1-n-tetradecyl-3-(β-diethylamino-ethyl)-imidazolidone-(2)*

2.5 mols (182.9 g.) of diethylamine (excess) are added to 1.1 mols (379.5 g.) of 1-n-tetradecyl-3-(β-chloroethyl)-imidazolidone-(2) dissolved in 500 ml. of dioxane and the mixture is heated to boiling for 6 hours in a round flask equipped with an effective condenser.

The cooled reaction mixture is added to 1.5 litres of water and the resulting mixture is extracted once with 600 ml. of methylene chloride and a second time with 400 ml. of methylene chloride. If necessary, the mixture has to be subjected to centrifugation for a better separation of the two layers. The combined methylene chloride solutions are each washed three times with 1.5 litres of water and dried thereafter over anhydrous sodium sulphate. After having distilled off the solvent, 404 g. of the crude base 1-n-tetradecyl-3-(β-diethyl-amino-ethyl)-imidazolidone-(2) are obtained.

The hydrochloride of 1-n-tetradecyl-3-(β-diethylamino-ethyl)-imidazolidone-(2) is obtained by adding the calculated amount of a solution of hydrogen chloride in anhydrous ether dropwise to a solution of 404.5 g. (1.06 mols) of the crude base in 1600 ml. of anhydrous ether, the addition of the ethereal hydrogen chloride solution however being terminated after the reaction mixture just showed an acid reaction. The thus precipitated hydrochloride is recrystallized from acetic acid ethyl ester.

M.P.: 79° C. (Kofler bench). Yield: 302 g. (68.1% of the theoretical).

EXAMPLE 2

*1-lauryl-3-(γ-diethylaminopropyl)-imidazolidone-(2)*

33.1 g. (0.1 mol) of 1-lauryl - 3 - (γ-chloropropyl)-imidazolidone-(2) are heated together with 16.1 g. (0.22 mol) of diethylamine in 100 ml. of dioxane to boiling under reflux for 8 hours. When adding water to the cooled reaction mixture an oily product separates. The mixture is extracted with ether, the ethereal solution is washed with water and dried over calcined potash. On distilling off the solvent, 34 g. of crude 1-lauryl-3-(γ-diethylaminopropyl)-imidazolidone-(2) are obtained.

The hydrochloride of 1-lauryl - 3 - (γ-diethylaminopropyl)-imidazolidone-(2) is obtained by dissolving 20 g. of the crude base in anhydrous ether and subjecting this solution to reaction with a saturated solution of hydrogen chloride in anhydrous ether with cooling. The precipitated hydrochloride is recrystallized from a mixture of acetic acid ethyl ester and anhydrous ether. M.P.: 90° C. (Kofler bench).

EXAMPLE 3

*1-n-hexadecyl-3-(β-diethylaminoethyl)-imidazolidone-(2)*

This base is produced from 37.3 g. (0.1 mol) of 1-n-hexadecyl - 3 - (β - chloroethyl) - imidazolidone-(2) and 16.1 g. (0.22 mols) of diethylamine as described in Example 1. Yield: 38 g. of the crude base.

The hydrochloride of 1-n-hexadecyl-3-(β-diethylaminoethyl)-imidazolidone-(2) is obtained from the crude base as described in Example 1. M.P.: 64° C. (Kofler bench).

EXAMPLE 4

*1-n-octadecyl-3-(β-diethylaminoethyl)-imidazolidone-(2)*

This base is prepared from 16 g. (0.04 mols) of 1-n-octadecyl-3-(β-chloroethyl)-imidazolidone-(2) and 6.6 g. (0.09 mols) of diethylamine as described in Example 1. Yield: 13 g. of the crude base.

The corresponding hydrochloride is prepared from the crude base as described in Example 1. M.P.: 67° C. (Kofler bench).

EXAMPLE 5

*1-oleyl-3-(β-diethylaminoethyl)-imidazolidone-(2)*

This base is prepared from 31.9 g. (0.08 mols) of 1-oleyl-3-(β-chloroethyl)-imidazolidone-(2) and 14.6 g. (0.2 mol) of diethylamine in 100 ml. of dioxane as described in Example 1. Yield: 34 g. of the crude base.

The corresponding hydrochloride of this base is obtained by treating the crude base with an ethereal solution of hydrogen chloride as described in Example 1. M.P.: 84° C. (Kofler bench).

EXAMPLE 6

*1-n-tetradecyl-3-(β-piperidinoethyl)-imidazolidone-(2)*

This base is prepared from 34.5 g. (0.1 mol) of 1-n-tetradecyl - 3 - (β - chloroethyl) - imidazolidone - (2) and 21.3 g. (0.25 mols) of piperidine in 100 ml. of dioxane as described in Example 2. Yield: 36 g. of the crude base.

The corresponding hydrochloride is obtained by treating the crude base with ethereal hydrogen chloride. After recrystallization from acetic acid ethyl ester, the hydrochloride has a melting point at 143° C. (Kofler bench).

EXAMPLE 7

*1-n-tetradecyl-3-(β-pyrrolidinoethyl)-imidazolidone-(2)*

This base is produced from 34.5 g. (0.1 mol) of 1-n-tetradecyl - 3 - (β - chloroethyl) - imidazolidone - (2) and 17.8 g. (0.24 mol) of pyrrolidine in 100 ml. of dioxane as described in Example 2. Yield: 35 g. of the crude base.

The corresponding hydrochloride is obtained by treating the crude base with ethereal hydrogen chloride. After recrystallization from acetic acid ethyl ester, it has a melting point at 129° C. (Kofler bench).

The corresponding citrate is obtained by adding a solution of 11.4 g. (0.03 mols) of the above base in 20 ml. of acetone to a solution of 5.8 g. (0.03 mols) of anhydrocitric acid in 60 ml. of acetone at room temperature. The resulting product is recrystallized from acetone. M.P.: 106° C. (Kofler bench).

EXAMPLE 8

*1-n-tetradecyl-3-(β-morpholinoethyl)-imidazolidone-(2)*

This base is produced from 34.5 g. (0.1 mols) of 1-n-tetradecyl-3-(β-chloroethyl)-imidazolidone-(2) and 21.8 g. (0.25 mols) of morpholine in 100 ml. of dioxane as described in Example 2. Yield: 36 g. of the crude base.

The corresponding hydrochloride may be obtained by treating the crude base with ethereal hydrogen chloride as described in Example 1. It is recrystallized from acetic acid ethyl ester. M.P.: 143° C. (Kofler bench).

The corresponding embonate is obtained in the following way: 11.9 g. (0.03 mols) of the above base and 5.8 g. (0.015 mols) of embonic acid are heated together with 120 ml. of acetone for about 1 hour under reflux until a clear solution is obtained. Thereafter, the acetone is distilled off in a vacuo and the residue is triturated with petroleum ether. M.P.: 62° C. (Kofler bench).

EXAMPLE 9

*1-n-tetradecyl-3-(β-diethylaminoethyl)-imidazolidone-(2)*

69.0 g. (0.2 mols) of 1-n-tetradecyl-3-(β-chloroethyl)-imidazolidone-(2), 73.1 g. (1.0 mol) of diethylamine and 50 ml. of benzene are heated in a 500 ml. autoclave for 5 hours at 120° C. The cooled reaction mixture is mixed with 150 ml. of benzene and the resulting mixture is washed several times with water. The benzene layer is dried over anhydrous sodium sulphate, filtered and thereafter the benzene is distilled off in vacuo. Yield: 69 g. of the crude base.

The crude base may be converted into the corresponding hydrochloride as described in Example 1.

EXAMPLE 10

*1-n-hexadecyl-3-(β-piperidinoethyl)-imidazolidone-(2)*

37.3 g. (0.1 mol) of 1-n-hexadecyl-3-(β-chloroethyl)-imidazolidone-(2), 8.5 g. (0.1 mol) of piperidine, 6.9 g. (0.05 mols) of potassium carbonate and 80 ml. of dioxane are heated to boiling under reflux for 8 hours. When adding water to the cooled reaction mixture an oily product separates. The mixture is extracted with methylene chloride, the organic layer is washed several times with water and dried over anhydrous sodium sulphate. On distilling off the solvent, 42 g. of crude 1-n-hexadecyl-3-(β-piperidinoethyl)-imidazolidone-(2) are obtained.

The corresponding citrate is obtained by dissolving 35.8 g. (0.085 mols) of the crude base in 100 ml. of acetone and adding the solution to a solution of 16.3 g. (0.085 mols) of anhydrocitric acid in 150 ml. of acetone at room temperature. The salt precipitates shortly thereafter and is recrystallized from acetone. M.P.: 107° C. (Kofler bench).

EXAMPLE 11

*Ointment recipe*

(1) W/O-ointment:

| | G. |
|---|---|
| 1-n-tetradecyl-3-(β-diethylaminoethyl)-imidazolidone-(2) hydrochloride | 0.25 |
| Demineralized water | 49.75 |
| Lanoline absorption base | 50.00 |

(2) O/W-ointment:

| | |
|---|---|
| 1 - n-tetradecyl-3-(β-diethylaminoethyl)imidazolidone-(2) hydrochloride | 0.25 |
| Polyethyl glycol cetyl stearyl ether | 12.00 |
| *Adeps lanae anhydricus* | 2.00 |
| Isopropyl myristate | 3.00 |
| Sorbit 70% | 10.00 |
| Methyl parabene | 0.20 |
| Distilled water | 78.55 |

What we claim is:

1. A compound selected from the group consisting of the basically substituted cyclic ureas of Formula I $$\begin{array}{c} R_2 \\ \diagdown \\ N-(CH_2)_nN \!-\!\!-\!\!-\!CH_2 \\ R_3 \quad\quad | \quad\quad | \\ \quad\quad O\!=\!C \quad CH_2 \\ \quad\quad \diagdown \;/ \\ \quad\quad N \\ \quad\quad | \\ \quad\quad R_1 \end{array} \qquad I$$

wherein $R_1$ is a member selected from the group consisting of the saturated and unsaturated aliphatic hydrocarbon groups having 12 to 18 carbon atoms, $n$ is a numeral selected from the group consisting of 2 and 3, and $R_2$ and $R_3$ are members selected from the group consisting of the lower alkyl groups and, together with the nitrogen atom to which they are attached, the piperidino, morpholino and pyrrolidino groups, and a salt thereof with a non-toxic acid.

2. A compound selected from the group consisting of 1 - n - tetradecyl-3-(β-diethylaminoethyl)-imidazolidone-(2) and a salt thereof with a non-toxic acid.

3. A compound selected from the group consisting of 1 - n - hexadecyl-3-(β-diethylaminoethyl)-imidazolidone-(2) and a salt thereof with a non-toxic acid.

4. A compound selected from the group consisting of 1 - oleyl - 3-(β-diethylaminoethyl)-imidazolidone-(2) and a salt thereof with a non-toxic acid.

5. 1 - n - tetradecyl-3-(β-diethylaminoethyl)imidazolidone-(2).

6. 1 - n - hexadecyl-3-(β-diethylaminoethyl)-imidazolidone-(2).

7. 1 - oleyl - 3-(β-diethylaminoethyl)-imidazolidone-(2).

8. 1 - n - tetradecyl-3-(β-diethylaminoethyl)-imidazolidone-(2) hydrochloride.

9. 1 - n - hexadecyl-3-(β-diethylaminoethyl)-imidazolidone-(2) hydrochloride.

10. 1 - oleyl - 3 - (β-diethylaminoethyl)-imidazolidone-(2) hydrochloride.

References Cited

UNITED STATES PATENTS

| 2,518,264 | 8/1950 | Abramovitch | 260—309.7 |
| 2,840,546 | 6/1958 | Yost | 260—309.7 |
| 2,840,561 | 6/1958 | Yost | 260—309.7 |
| 3,196,152 | 7/1965 | Wright et al. | 260—309.7 |

WALTER A. MODANCE, *Primary Examiner.*

N. TROUSOF, *Assistant Examiner.*